(12) United States Patent
Kisaka

(10) Patent No.: US 6,958,882 B2
(45) Date of Patent: Oct. 25, 2005

(54) SHOCK CONTROL FOR ROTATIONAL RECORDING APPARATUS

(75) Inventor: Masashi Kisaka, Yokohama (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 308 days.

(21) Appl. No.: 10/245,258

(22) Filed: Sep. 17, 2002

(65) Prior Publication Data

US 2003/0058571 A1 Mar. 27, 2003

(30) Foreign Application Priority Data

Sep. 21, 2001  (JP) ........................................ 2001-290031

(51) Int. Cl.[7] .............................................. G11B 5/596
(52) U.S. Cl. .................................................. 360/78.04
(58) Field of Search ................................ 360/78.04, 75

(56) References Cited

FOREIGN PATENT DOCUMENTS

| JP | 06-333325 | 2/1994 |
|---|---|---|
| JP | 07-130114 | 5/1995 |

*Primary Examiner*—David Hudspeth
*Assistant Examiner*—K. Wong
(74) *Attorney, Agent, or Firm*—Robert B. Martin; Duke Amaniampong; Dillon & Yudell LLP

(57) ABSTRACT

A rotational recording apparatus that comprises a shock sensor and that adaptively processes the output of the shock sensor to obtain a feed forward signal, so as to implement a stable operation within a practical range. In a rotational recording apparatus wherein a VCM system having a transfer function (G) and a controller having a transfer function (H) perform feedback, the band of a signal(s) of a shock sensor (S) is limited by a bandpass filter (F), and a resultant signal (f) is employed to obtain the output of an adaptive filter (FIR). A signal (p) that a phase shift filter (P) outputs by shifting the phase of the signal f is employed as a signal to be transmitted to a parameter adaptation algorithm (PAA). Within the limited band, the phase of the phase shift filter P matches the phase of G/(1+GH) within a range of ±90 degrees.

16 Claims, 8 Drawing Sheets

SHOCK CONTROL FOR ROTATIONAL RECORDING APPARATUS

This application claims the priority of Japanese Patent No. JP2001-290031 (IBM Docket No. JP920010157JP1), filed on Sep. 21, 2001, entitled "Shock Control For Rotational Recording Apparatus".

BACKGROUND OF THE INVENTION

1. Technical Field

The present invention relates to a rotational recording apparatus, such as a hard disk drive (hereinafter referred to as an HDD), and a control method therefor. More particularly, the present invention relates to a technique for applying feed forward control, using an adaptive filter, to control the position of an HDD head for which a shock sensor is provided.

2. Description of the Related Art

Recently, as the memory capacity provided for recording media for rotational recording apparatuses, especially HDDs, has been increased, the track widths employed for data recording have narrowed. As a consequence of this reduction in track widths, a need has been established for stricter control of the level of the disturbance produced mechanical vibrations to which a head is subjected. That is, since the probability has been increased that the offtracking of a head will occur from disturbance by vibrations that would not affect the head when the track width was satisfactorily large, a demand exists for means to limit head vibration, due to the disturbance, to an oscillation range that is appropriate for the track width. While head offtracking during data reading is a problem, because of data reading errors that occur, head offtracking during data writing is an even more critical problem. When offtracking occurs during the data writing process, not only is data not written to an intended track, but data on an adjacent track may be destroyed. Therefore, the prevention, to the extent possible, of head offtracking is imperative.

For the prevention of head offtracking due to a disturbance, a technique is well known whereby a shock sensor, such as an acceleration sensor, is provided for a rotational recording apparatus, such as an HDD, and the shock sensor output is employed for head positioning. For example, a technique is disclosed in Japanese Unexamined Patent Publication No. Hei 6-333325 (document 1) whereby the output of an acceleration sensor is passed through a filter, which is obtained using the transfer function of a head positioning control system, to calculate the position of a head, and when the position of the head exceeds a predetermined positioning range, data writing is inhibited. According to this technique, when sensor output is obtained indicating that head offtracking can occur, writing is inhibited, so as to prevent, for example, the destruction of data along an adjacent track.

Another technique, disclosed in Japanese Unexamined Patent Publication No. Hei 7-130114 (document 2), provides for sensor output to be transmitted to a filter having the same dynamic characteristics as the transfer function of a system for transmitting an acceleration disturbance received by a head actuator, and for a feed forward control signal to be generated that is employed to cancel out a disturbance produced vibration that can affect head positioning. That is, a filter is obtained in advance that can simulate the movement of a head due to a disturbance, and a signal output by the filter that receives the sensor output is employed to exercise the feed forward control. According to this technique, when a disturbance acts on a head, quick head positioning control can be implemented, and the occurrence of head offtracking can be prevented.

However, the following problems are inherent to the conventional techniques described above. Specifically, according to the technique in document 1, the occurrence of offtracking is predicted, and when the probability of the occurrence of offtracking is high, serious damage can be prevented by inhibiting data writing. However, this technique does not suppress the vibration of a head due to a disturbance, and can not prevent offtracking. In other words, this technique merely erects an individual barrier that will prevent the occurrence of an undesirable event when the head is off the track. For example, when a continuous disturbance, such as a cyclic vibration, acts on the head, normal data writing can not be performed while the disturbance continues.

According to the technique in document 2, it is ensured that at a head position the vibration due to a disturbance will be suppressed. However, this technique is based on the assumption that a filter has been obtained for reproducing the movement of a head when a disturbance occurs. At this point, a problem arises. That is, although the movement of a head can be precisely reproduced when appropriate sensor output is available, it is generally difficult to obtain in advance a relationship that will provide the needed output.

Since a system may change dynamically, adaptive signal processing using an adaptive algorithm is a well known method for optimally controlling a system wherein a parameter can be varied. Means can be employed by which the adaptive algorithm is employed to obtain the filter coefficient used in document 2. In accordance with the adaptive filter that is used for this adaptive algorithm, it is anticipated that the optimal parameter will be obtained while a feed forward signal that implements the optimal head position control using the sensor output is generated. However, the following problem is encountered with this method.

FIG. 8 is a block diagram showing an example conventional control system for adaptively performing the feed forward process using a signal output by a shock sensor. An HDD is employed as an example. When G denotes the transfer function of a VCM (Voice Coil Motor) system extending from the transmission (input point I) of a current for a VCM to the head position (deviation d from a target value), and H denotes the transfer function of a controller extending from the head position deviation d to a feedback control signal fb, the output (deviation d) of the transfer function G is fed back through the transfer function H to the input point I. On the other hand, a disturbance ef acts on a mechanism MS to generate a head position deviation def that causes a disturbance, and also acts on a shock sensor to generate output s. The sensor output s is passed through an adaptive filter FIR, and is transmitted to the input point I as a feed forward signal ff. The parameter of the FIR is then determined by a parameter adaptation algorithm PAA, so that the feed forward signal ff cancels out the head position deviation def that caused the disturbance. To determine the parameter, the head position deviation d and the sensor output s must be referred to; however, since the position acted on by the FIR output (feed forward signal ff) differs from the position acted on by the head position deviation d, phase compensation is required. A filter that controls the phase compensation is a phase shift filter, and this phase shift filter is the one that approximates $G/(1+GH)$.

The problem with this technique is that the phase shift filter must approximate $G/(1+GH)$ for the entire frequency band. And when the order of the phase shift filter is raised, approximating is especially difficult. If the phase shift filter can not approximate G/(1+GH) in the operating frequency band, the stable operation of the PAA is not guaranteed, and the normal operation of the control system in FIG. 8 can not be expected.

It is, therefore, one object of the present invention to provide a rotational recording apparatus that comprises a shock sensor and that adaptively processes the output of the shock sensor to obtain a feed forward signal, so as to implement a stable operation within a practical range.

SUMMARY OF THE INVENTION

An overview of the invention will now be presented. According to the present invention, a rotational recording apparatus comprises: a head for, reading data from a recording medium that is rotated; head driving means for driving the head; head position detection means for outputting current data for the position of the head on the recording medium; a controller for receiving a deviation between the current position data and a target position, and for generating a feedback control signal to be transmitted to the head driving means; a sensor for detecting a disturbance that acts on the rotational recording apparatus; a bandpass filter for passing the output signal of the sensor in a predetermined frequency band; an adaptive filter for receiving the signal output by the bandpass filter and for generating a feed forward control signal to be transmitted to the head driving means; a phase shift filter for shifting the phase of the signal output by the bandpass filter; and adaptive algorithm means for calculating coefficients for the adaptive filter using the deviation and the signal output by the phase shift filter.

According to the rotational recording apparatus, the optimal feed forward control signal output in response to a disturbance can be generated by using the adaptive algorithm, and especially since the band of the output by the sensor is limited by the bandpass filter, a stable system operation can be obtained. It is difficult, however, to obtain for the entire frequency band, a phase shift filter that exactly matches the feedback loop in the phase. Nevertheless, since the band is limited, it is easy to obtain, within a limited range, a phase shift filter that matches the model of the feedback loop. As a result, a more practical rotational recording apparatus can be provided.

A difference between the phase of a signal that is passed through the phase shift filter and the phase of a signal that is passed through a model that has a transfer function G/(1+GH) (G denotes the transfer functions of the head driving means and the head position detection means, and H denotes the transfer function of a controller) falls within a predetermined range in a frequency band area. The predetermined range is, for example, ±90 degrees. So long as the phase difference is present in this range, the adaptive algorithm can be stably operated. In this case, the least-mean-squares method (LMS) can be employed as an example adaptive algorithm.

The order of the phase shift filter can be lower than the order of the model. Since in this invention the phases need only be matched within a limited band, a complicated filter, i.e., a high-order filter, is not required. The order is, for example, a second or a lower order.

An example pass band for the bandpass filter can be one having a range of from 200 Hz to 500 Hz. Since the head position deviation caused by a vibration at a low frequency of 200 Hz or less can be suppressed by the feedback control, there is little need for compensation using feed forward. On the other hand, when it is assumed that this invention will be applied for an HDD mounted in a notebook computer, it is not highly probable that the HDD will be used under conditions wherein vibration occurs at a high frequency of 500 Hz or greater. Therefore, practically, it will be satisfactory if a stable operation can be obtained within a range of from 200 Hz to 500 Hz.

Multiple sets of the bandpass filters, the adaptive filters, the phase shift filters and the adaptive algorithm means may be employed. When the pass band of the bandpass filter of each set is appropriately distributed (naturally the phase shift filter will be so designed that it is appropriate for the pass band), the stable operation of the adaptive algorithm can be ensured within a wide frequency range.

The rotational recording apparatus of the invention can be also provided as a method for implementing the functions thereof.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
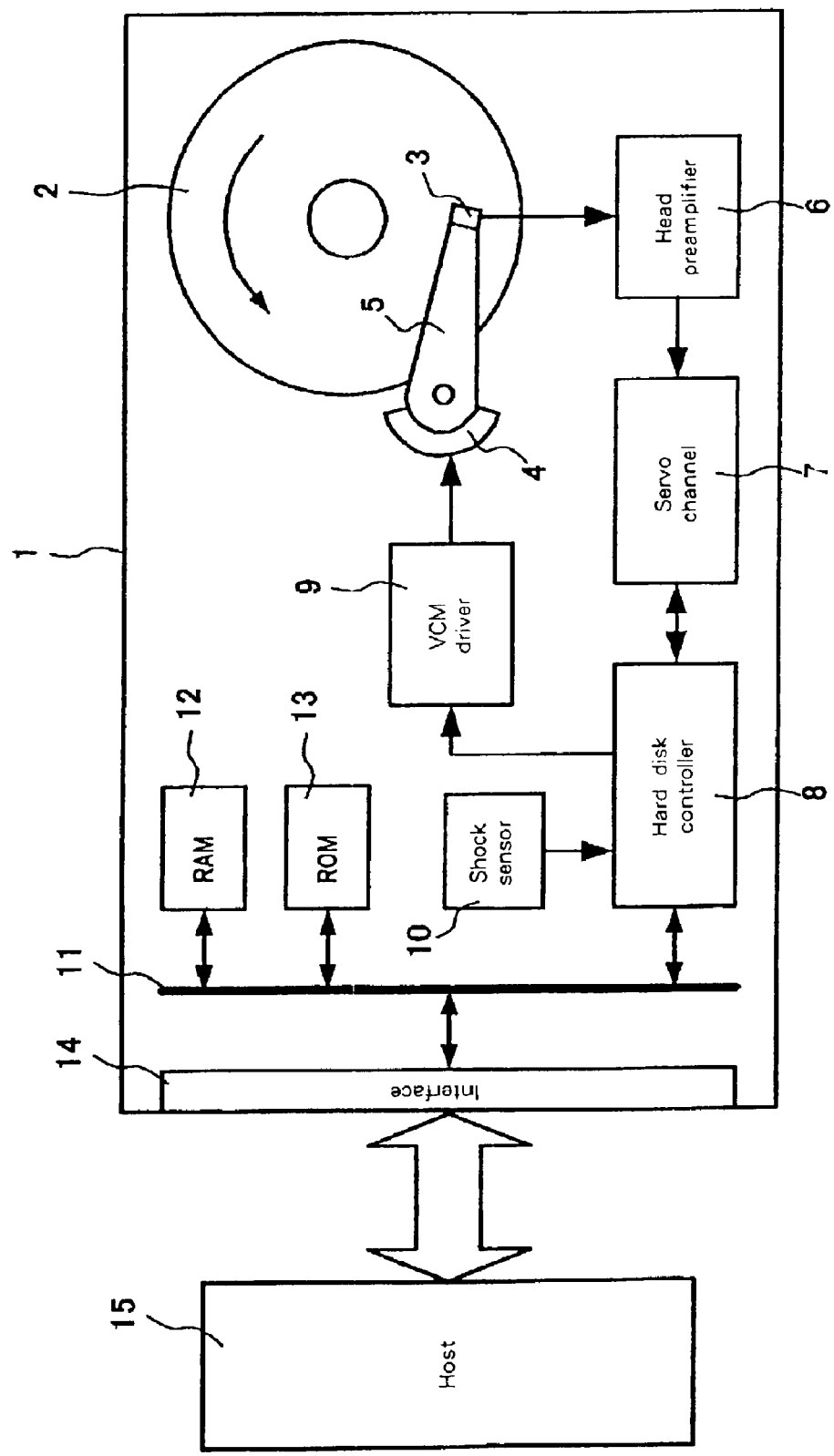
FIG. 1 is a block diagram showing an example hard disk drive according to one embodiment of the present invention.

The preferred embodiment of the present invention will now be described in detail while referring to the accompanying drawings. It should be noted, however, that the present invention can be implemented for various other modes and should not be limited to this embodiment. The same reference numerals are employed throughout the embodiment to denote corresponding or identical components.

With reference now to FIG. 1 there is depicted a block diagram showing an exemplary hard disk drive according to one embodiment of the present invention. According to this embodiment, a hard disk drive 1 includes: a magnetic recording medium 2, a head 3, a voice coil motor (VCM) 4, an arm 5, a head preamplifier 6, a servo channel 7, a hard disk controller 8, a VCM driver 9, a shock sensor 10, a bus 11, a RAM (Random Access Memory) 12, a ROM (Read Only Memory) 13 and an interface 14.

The magnetic recording medium 2 is a recording disk medium, rotated by a spindle motor, for example, on which information is magnetically recorded, and on which position data is radially recorded in advance.

The head 3 has a function for recording data magnetically or for reading magnetically recorded data, and employs, for example, great magnetic resistance (GMR) effects to convert magnetic data into an electric signal.

The VCM 4 drives the arm 5 in response to a current, and moves the head 3 provided at the distal end of the arm 5 in the radial direction of the recording medium 2. Together, the VCM 4 and the arm 5 constitute an actuator.

The head preamplifier 6 amplifies an analog signal received from the head 3 and transmits the amplified signal to the servo channel 7. It should be noted that the analog signal is amplified to a constant level under auto gain control.

The hard disk controller 8, which controls the entire disk drive, receives, for example, a servo signal from the servo channel 7 and outputs a head control signal to the VCM driver 9.

The VCM driver 9 receives a head control signal from the hard disk controller 8, and generates a drive current to drive the VCM 4. It should be noted that in general, the maximum drive current is limited due to the capacity of a power source.

The shock sensor 10, which detects a disturbance that acts on the hard disk drive 1, can be, for example, an acceleration sensor. The output of the shock sensor 10 is generally an analog signal, and is sampled by appropriate quantization means (not shown), such as an A/D converter.

The hard disk controller 8 is connected to the RAM 12, the ROM 13 and the interface 14 by the bus 11. The interface 14 interfaces a host 15. A program to be processed by the MPU of the hard disk controller 8 is stored in the ROM 13, and is loaded from the ROM 13 to the RAM 12. The RAM 12 also functions as a buffer for the input/output of data for the host 15. In this embodiment, the RAM 12 and the ROM 13 are connected to the same bus as the interface 14; however, a faster bus than the bus 11 may be provided, and the RAM 12 and the ROM 13 may be connected to this fast bus.

Figure 2:
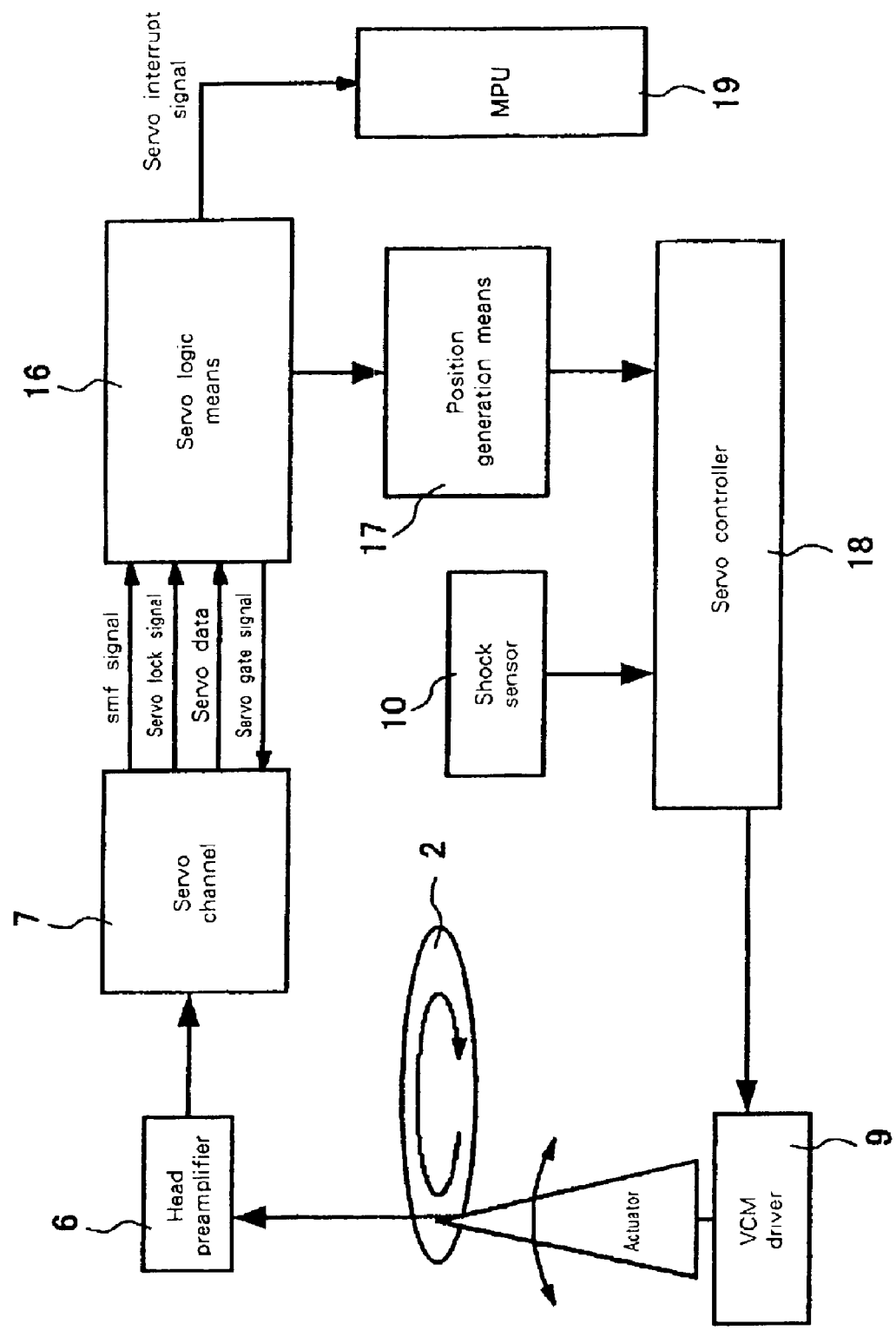
FIG. 2 is a more detailed block diagram showing a hard disk controller 8 and its peripheral members.

FIG. 2 is a more detailed block diagram showing the hard disk controller 8 and the peripheral members. In addition to the above described members or means, the following members and means are provided. That is, the hard disk drive 1 further comprises servo logic means 16, position generation means 17, a servo controller 18 and a microprocessing unit (MPU) 19. Many members or means are provided as a one-chip device for the hard disk controller 8; however, they may also be formed as discreet elements.

As is described above, position data is radially recorded on the magnetic recording medium 2. The position data includes a servo address mark (SAM), a Gray code and a burst signal. The data on the recording medium 2, including the position data, is read by the head 3 and is amplified by the head preamplifier 6, and the resultant signal is transmitted to the servo channel 7. The SAM is used for the detection of the current track position of the head 3, and the Gray code is used for the detection of the displacement of the head 3 relative to the track center.

The servo channel 7 detects the SAM from the analog waveform of the head preamplifier 6, and upon the detection of the SAM, transmits an smf (servo address mark found) signal to the servo logic means 16. Further, the servo channel 7 decodes the Gray code following the SAM, and performs an A/D conversion for the burst signal. These data are then serially transferred via a servo data line to the servo logic means 16. The servo channel 7 is itself rendered active by a servo gate signal.

The servo logic means 16 controls the timing for rendering the servo channel 7 active in order to read a servo pattern (position data) that is written to the recording medium 2 at a designed sampling interval (control cycle). The data obtained from the servo channel 7 is transferred to the position generation means 17. Further, at the timing whereat the position data is obtained, the servo logic means 16 generates a servo interrupt for the MPU 19, and at the same time, generates the status of a servo lock. The servo logic means 16 may include a function for monitoring the state of the detection of the SAM by the servo channel 7, and for generating a dummy SAM when the SAM is not detected within a predetermined time window.

The position generation means 17 generates the current position based on the servo pattern, and employs the obtained current position and the target position to calculate position deviation data that is required for the control process. The position data and the deviation may be generated by the servo logic means 16.

A servo controller 18 employs the deviation between the current head position and the target position, or the sensor signal output by the shock sensor 10, to generate a control signal to be transmitted to the VCM driver 9. As will be described later, the control signal is constituted by a feedback control signal and a feed forward control signal. The servo controller 18 incorporates a system, a filter model and a parameter that are required for the generation of a control signal.

At the preceding stage of the servo controller 18, input optimization means may be provided that has a function for examining data output by the position generation means 17 and for preventing the servo controller 18 from discontinuously outputting data. Furthermore, a digital filter, such as a notch filter for restricting the resonance of a mechanism, may be provided at the succeeding stage of the servo controller 18. The position generation means 17 may be implemented as the servo controller 18.

The MPU 19 executes various controls in accordance with micro code recorded in the RAM 12 or the ROM 13. The MPU 19 has a control function, especially important to the embodiment, for providing servo control in accordance with an interrupt signal transmitted by the servo logic means 16.

Figure 3:
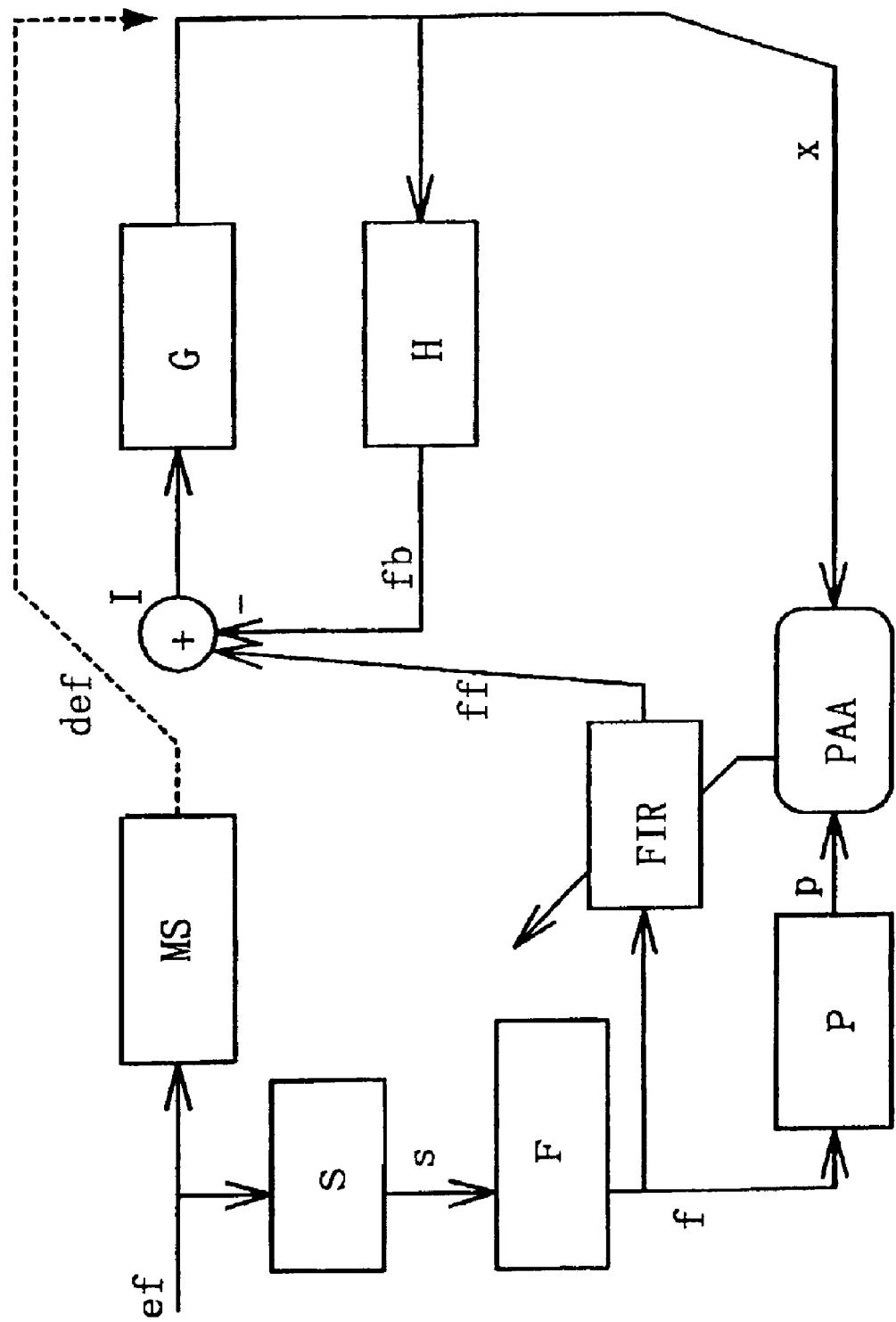
FIG. 3 is a block diagram showing an example model of a control system according to the embodiment.

FIG. 3 is a block diagram showing a model of a control system according to a preferred embodiment of the present invention. A VCM transfer function G is the model for the process from the input I of the VCM driver 9 until the detection of a head position (the current head position x), and a controller transfer function H is the model for the process until the generation of a feedback control signal fib via a controller by using the current head position x.

When J denotes inertia, K denotes a torque constant, P denotes a track pitch, L denotes the distance from the head 3 to the rotation center of the actuator, T denotes a sampling time, and qT denotes a period of time extending from the reading of the position data by the head 3 to the setting of the VCM drive current to a DAC (D/A converter). The discrete equation of motion wherein the VCM system is driven at a constant current is represented by equation 1. In the following explanation, the time element is represented by sample n, and the time from $n=n_0$ to $n=n_1$ is $(n_1-n_0)T$.

$$X_p(n+1) = AX_p(n) + Bu(n) \qquad \text{[Equation 1]}$$

wherein $X_p(n)$ is represented by equation 2.

$$X_p(n) = \begin{bmatrix} x(n) \\ v(n) \\ u(n-1) \end{bmatrix} \qquad \text{[Equation 2]}$$

wherein x(n) denotes the head position (track) at the time n, u(n) denotes the head velocity (track/sampling time) at the time n, and u(n) denotes a VCM current (A) at the time n.

Furthermore, A and B are represented by equations 3 and 4.

$$A = \begin{bmatrix} 1 & 1 & q\left(1-\frac{1}{2}q\right)T^2C/\theta_t \\ 0 & 1 & qT^2C/\theta_t \\ 0 & 0 & 0 \end{bmatrix} \quad \text{[Equation 3]}$$

$$B = \begin{bmatrix} \frac{1}{2}(1-q)^2T^2C/\theta_t \\ (1-q)T^2C/\theta_t \\ 1 \end{bmatrix} \quad \text{[Equation 4]}$$

wherein $C=K_t/J$ and $q_r=P/L$.

For a typical HDD, specific values are K=0.002 Nm/A, $J=0.1\times10^{-7}$ Kgm$^2$, $P=1.337\times10^{-6}$ m, L=0.0161 m, $T=2.38095\times10^{-4}$ s and q=0.13.

Suppose that the controller that can stably control this VCM system is represented by equation 5.

$$X_c(n+1)=A_cX_c(n)+B_c(x(n)-t(n))\ u(n)=-(C_cX_c(n)+D_cx(n)) \quad \text{[Equation 5]}$$

wherein t(n) denotes a position target (target position) at the time n, and $X_c(n)$ denotes a state variable for the controller. The first term of the state variable corresponds to an integrator, the second term corresponds to the position at n−1, the third term corresponds to a VCM current at n−1 and the fourth term corresponds to a VCM current at n−2.

When the parameters having the above described specific values are employed for equation 5, $A_c$, $B_c$, $C_c$ and $D_c$ are represented by equations 6 to 9.

$$A_c = \begin{bmatrix} 1 & 0 & 0 & 0 \\ 0 & 0 & 0 & 0 \\ 0.000129 & -0.00380 & -0.0907 & 0.0408 \\ 0 & 0 & 1 & 0 \end{bmatrix} \quad \text{[Equation 6]}$$

$$B_c = \begin{bmatrix} 1 \\ 1 \\ 0.00482 \\ 0 \end{bmatrix} \quad \text{[Equation 7]}$$

$$C_c = [0.000129 - 0.00380 - 0.0907\ 0.0408] \quad \text{[Equation 8]}$$

$$D_c = [0.00482] \quad \text{[Equation 9]}$$

Assume that a disturbance ef acts on a feedback system that includes the VCM system (transfer function G) and a controller (transfer function H). The disturbance ef acts on a mechanism MS to generate a deviation def for the head position, and also acts on a shock sensor S to generate a sensor output s. In this embodiment, a bandpass filter F is employed to limit the band for the sensor output s. Since the band is limited by the bandpass filter F, the phase shift performed by the phase shift filter, which will be described later, need only match G/(1+GH) in the pass band range. Only a low order phase shift filter is required, and the design of the phase shift filter is simple and practical.

Figure 4:
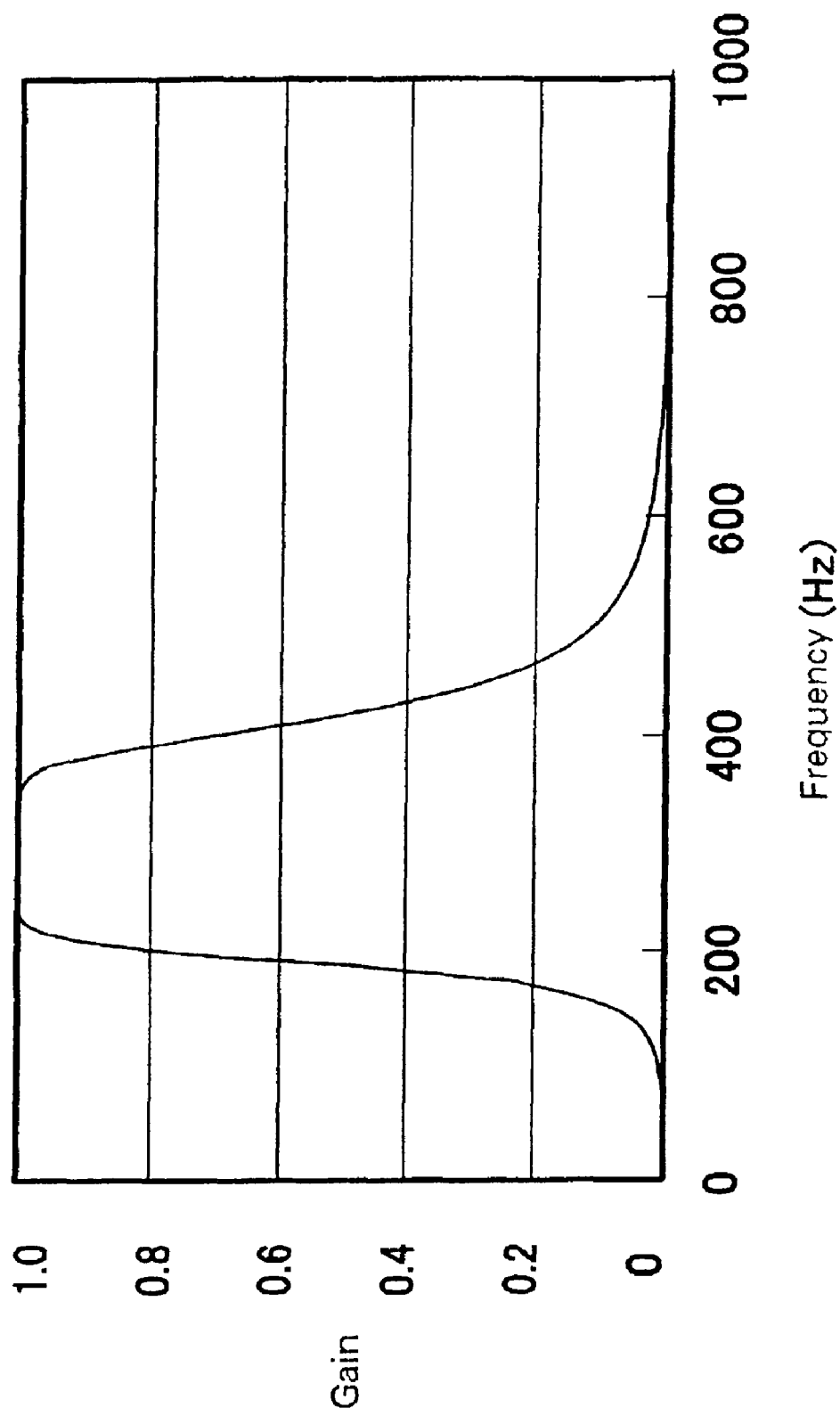
FIG. 4 is a graph showing the gain characteristic of a bandpass filter according to the embodiment.

FIG. 4 is a graph showing the gain characteristic of the bandpass filter used in this case. The bandpass filter has a pass band in a frequency range of about 200 to 400 Hz. Since a disturbance having a frequency of 200 Hz or less can be compensated for by the feedback system, and since the HDD is seldom used for a frequency of 400 Hz or greater, so long as the adaptive filter is stably operated within this range, for practical use, the bandpass filter is satisfactory.

The bandpass filter F is preferably a Butterworth filter, and is represented by equation 10 when the input of the bandpass filter F is denoted by s(n) and the output is denoted by f(n).

$$X_b(n+1)=A_bX_b(n)+B_bs(n)\ f(n)=C_bX_b(n)+D_bs(n) \quad \text{[Equation 10]}$$

It should be noted that to obtain the characteristic in FIG. 4, $A_b$, $B_b$, $C_b$ and $D_b$ are represented by equations 11 to 14.

$$A_b = \begin{bmatrix} 1.5534 & -0.8636 & 0 & 0 & 0 & 0 & 0 \\ 1 & 0 & 0 & 0 & 0 & 0 & 0 \\ 0.292505 & -0.350916 & 1.8338 & -0.9232 & 0 & 0 & 0 \\ 0 & 0 & 1 & 0 & 0 & 0 & 0 \\ 0.0310056 & -0.0371971 & 0.194383 & -0.203859 & 1.5248 & -0.7282 & 0 \\ 0 & 0 & 0 & 0 & 1 & 0 & 0 \\ 0.00461053 & -0.00552121 & 0.0289047 & -0.0303139 & 0.226738 & -0.256983 & 1.6661 \\ 0 & 0 & 0 & 0 & 0 & 0 & 1 \end{bmatrix} \quad \text{[Equation 11]}$$

$$B_b = \begin{bmatrix} 1 \\ 0 \\ 0.1883 \\ 0 \\ 0.0199598 \\ 0 \\ 0.00296802 \\ 0 \end{bmatrix} \quad \text{[Equation 12]}$$

$$C_b=[0.000541276 -0.000649364\ 0.00339341 -0.00355885$$
$$0.026619 -0.0301698\ 0.1956 -0.209618]$$  [Equation 13]

$$D_b[0.000348446]$$  [Equation 14]

An output f of the bandpass filter F is transmitted to the adaptive filter FIR, where a feed forward control signal ff is generated. The feed forward signal ff is transmitted to the input point 1 together with a feedback control signal fb. The phase of the filter output f is then shifted by the phase shift filter P to generate an output p, and the parameter adaptation algorithm PAA adaptively obtains coefficients, by using a current head position x and the phase shift filter output p, that are employed for the adaptive filter FIR.

Since, as is described above, the band of the sensor signal is limited, the phase shift filter P can be a simple, second-order filter. For example, a filter can be employed that has input f(n) and output p(n), as represented in equation 15.

$$X_p(n+1)=A_pX_p(n)+B_pf(n)\ p(n)=C_pX_p(n)$$  [Equation 15]

It should be noted that $A_p$, $B_p$ and $C_p$ are as follows.

$$A_p = \begin{bmatrix} 0.324584 & 0 \\ 1 & 0 \end{bmatrix}$$  [Equation 16]

$$B_p = \begin{bmatrix} 478.1 \\ 0 \end{bmatrix}$$

$$C_p = [-1\ \ 3.08086]$$

Figure 5:
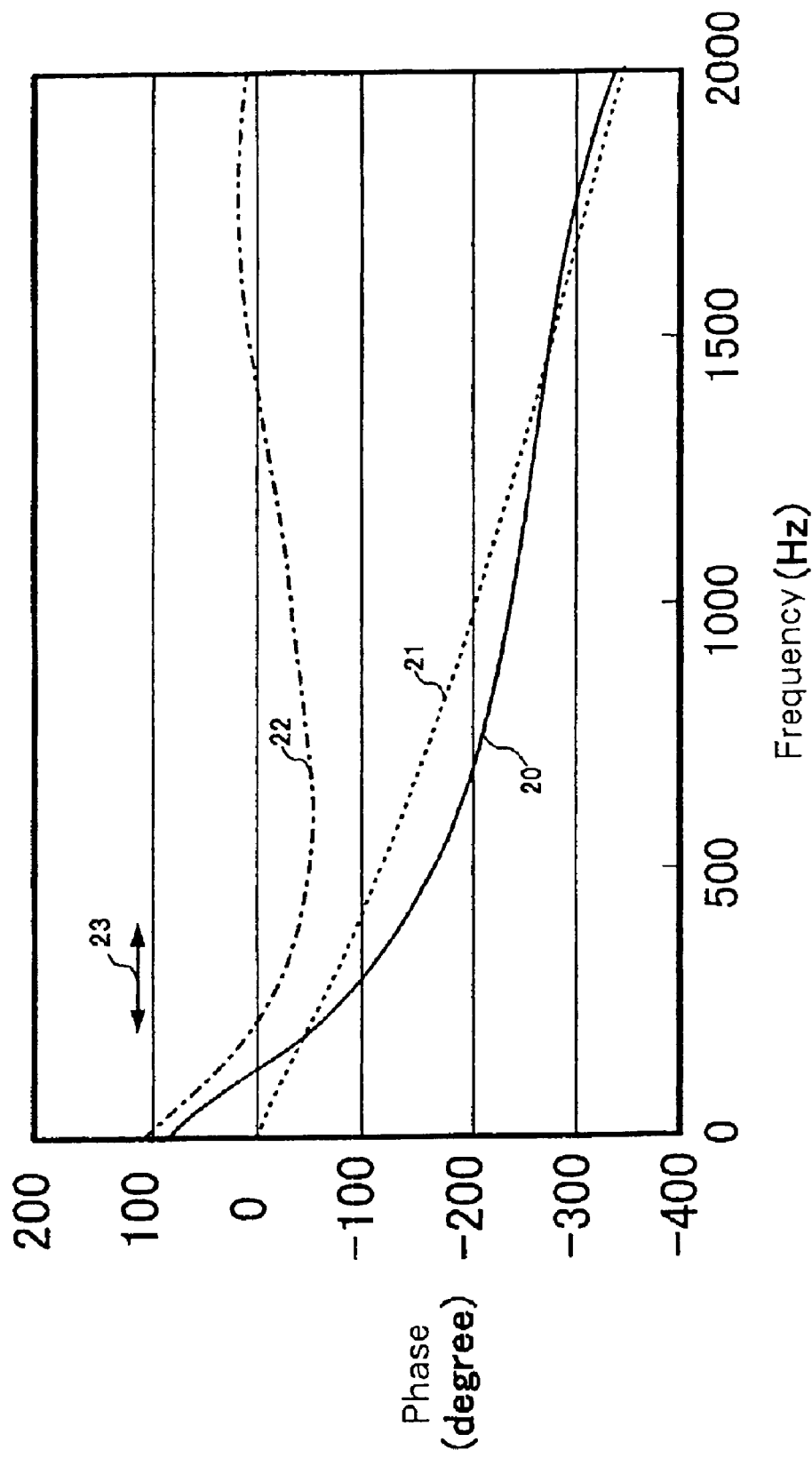
FIG. 5 is a graph showing a comparison of the phase shifted by a phase shift filter and the phase of transfer function G/(1+GH) for a closed loop.

FIG. 5 is a graph showing a comparison between the phase shifted by the phase shift filter represented in equations 15 and 16 and the phase of the transfer function G/(1+GH) of a closed loop. A curve 20 (solid line) represents the phase of the transfer function G/(1+GH), a curve 21 (broken line) represents the phase of the phase shift filter, and a curve 22 (chained line) represents a difference between the two. Within the limited band, the phase difference falls within a range of ±90 degrees. It is preferable that for the adaptive algorithm of the LMS method the difference be zero; however, it is understood that the operation is stabilized so long as the phase difference falls within this range.

Figure 6:
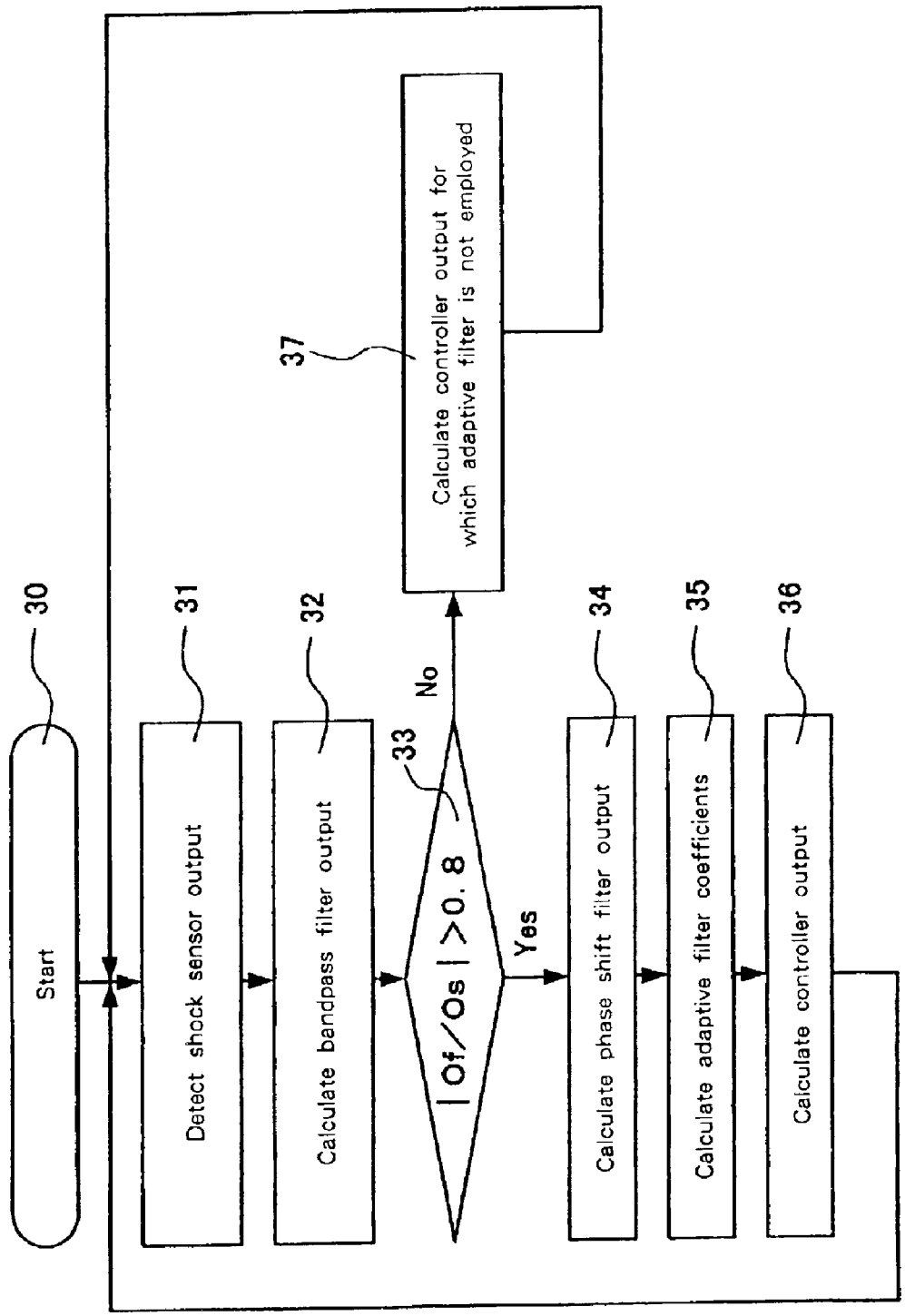
FIG. 6 is a flowchart showing an example control method according to the embodiment.

FIG. 6 is a flowchart showing an example control method according to the embodiment. The processing in FIG. 6 is performed for each sampling cycle. The processing performed at a time n will now be described. Upon receiving a sampling signal at the time n, the processing is initiated (step 30) and the output s(n) of the shock sensor S is detected (step 31). Then, the output s(n) is employed to calculate the output f(n) of the bandpass filter F (step 32). Equation 10 is employed for this calculation.

Then, a check is performed to determine whether the ratio of the output f(n) of the bandpass filter to the output s(n) of the shock sensor S is greater than a predetermined value (step 33). When the output s(n) of the shock sensor S is smaller than the output f(n) of the bandpass filter, a signal outside a band may adversely affect the processing. Therefore, when the output f(n) is small, the following algorithm is not employed for the processing. An average absolute output value can be employed to determine whether the output f(n) is smaller. For example, at step 33, an average absolute value ($O_f$) of the output f(n) of the bandpass filter is divided by the average absolute value ($O_s$) of the output s(n) of the shock sensor S, and whether the obtained value is equal to or greater than 0.8 is determined. According to the determination, the following algorithm is employed.

When the decision at step 33 is true (the output f(n) is greater), the output p(n) of the phase shift filter is calculated. Equation 15 is employed for this calculation.

Thereafter, the coefficients for the adaptive filter are calculated and the output of the adaptive filter is obtained (step 35). When the coefficients for the adaptive filter are defined as $r_0, r_1, \ldots$ and $r_{m-1}$, this calculation can be represented by using a matrix. That is, $$R(n)=[r_0\ r_1\ \ldots\ r_{m-1}].$$

A matrix P(n) is generated by using outputs p(n−1), p(n−2), ..., p(n−m+1) of the phase shift filter, which were obtained during the preceding sampling, and output p(n) that is obtained during the current sampling. That is, $$P(n)=[p(n)p(n-1)\ \ldots\ p(n-m+1)].$$

When the LMS adaptive algorithm is employed, $$R(n)=R(n-1)-2ax(n)P(n)$$

is obtained.

Further, a matrix F(n) is generated by using the outputs f(n−1), f(n−2), ..., f(n−m+1) of the bandpass filter, which were obtained by the preceding sampling, and output f(n), which is obtained by at the current sampling. That is, $$F(n)=[f(n)f(n-1)\ \ldots\ f(n-m+1)].$$

The output 1(n) of the adaptive filter is $$1(n)=R(n)F(n),$$

wherein 1(n) is a feed forward control signal that is stably output.

The thus obtained 1(n) is added to obtain the controller output (step 36), which is represented by equation 17.

$$X_c(n+1)=A_cX_c(n)+B_cx(n)\ u(n)=$$
$$-(C_cX_c(n)+D_cx(n))+1(n)$$  [Equation 17]

When the decision at step 33 is false, the process beginning at step 34 is not performed, and the controller output is calculated (step 37). As is described above, in order to prevent the adaptive algorithm from being adversely affected by a signal outside the band of the bandpass filter F, the algorithm is not employed if the output f(n) of the bandpass filter is smaller than the output s(n) of the shock sensor S. That is, when the ratio of the average absolute value ($O_f$) of the output f(n) of the bandpass filter to the average absolute value ($O_s$) of the output s(n) of the shock sensor S is equal to or less than 0.8, the controller output is calculated by using equation 18.

$$X_c(n+1)=A_cX_c(n)+B_cx(n)\ u(n)=-(C_cX_c(n)+D_cx(n))$$  [Equation 18]

Figure 7:
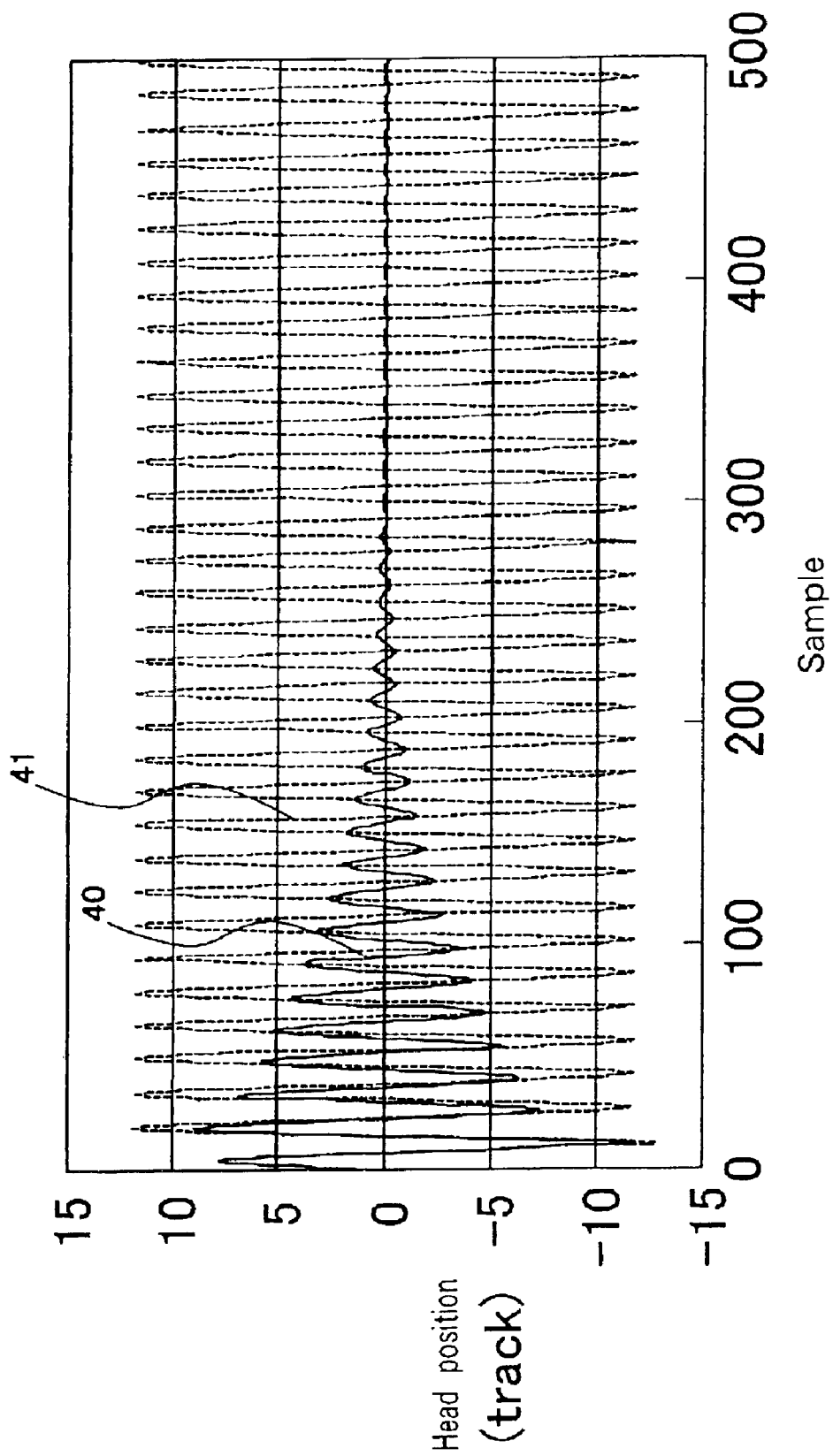
FIG. 7 is a graph in which the vertical axis represents a head position when a sine wave of 280 Hz is added as a disturbance, and the horizontal axis represents a sample (time)
Figure 8:
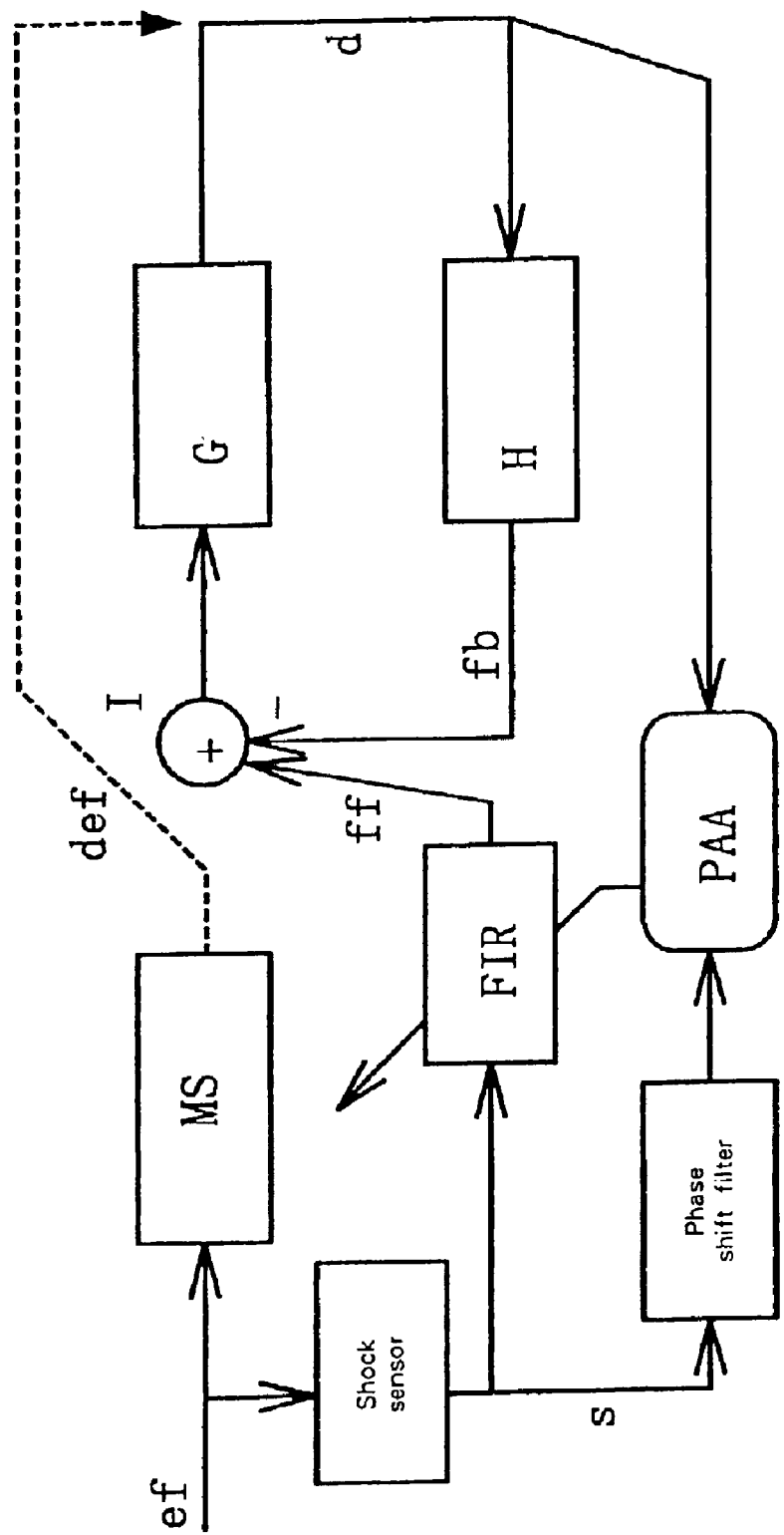
FIG. 8 is a block diagram showing an example conventional control system for performing the adaptive feed forward for a signal received from a shock sensor.

FIG. 7 is a graph showing an example of the control provided using the above described method. In FIG. 7, the vertical axis represents the head position when a sine wave of 280 Hz is added as a disturbance, and the horizontal axis represents a sample. The sample represents an arbitrary sampling time, and is converted into a time dimension by multiplying it by the sampling time (cycle) T. A curve 40 indicates a case wherein the LMS adaptive filter of the invention is applied, and a curve 41 indicates a case wherein the LMS adaptive filter is not applied. It has been found that when the adaptive filter is applied, the effect produced by a disturbance is gradually attenuated following the reception of a feed forward signal. It has further been found that when the adaptive filter is not employed, the effect produced by the disturbance is continued.

According to the embodiment, even when the modeling of the system can not be ideally performed, the filter coefficients can be optimized by using the adaptive filter. In addition, since the band of the sensor output is limited, a simple, low-order filter can be employed as the phase shift filter. Therefore, a system can be easily obtained that is stable within a practical range.

The present invention has been described by using the embodiment. However, the present invention is not limited to this embodiment, and various modifications are possible without departing from the scope of the invention.

The order of the phase shift filter is not limited to the second order. When the limited band width is narrow, a practical system can be satisfactorily constituted even by using a first-order filter.

Multiple bandpass filters F and adaptive filters FIR may be provided and may be connected in parallel. With this arrangement, even when the band of the bandpass filter F is narrow, a wide range can be covered by using multiple filters. It should be noted that in this case the phase shift filter P and the parameter adaptation algorithm PAA should be prepared for each adaptive filter FIR.

Further, the adaptive filter is not limited to the LMS, and a filter that adaptively changes a parameter as it learns can also be employed.

In this embodiment, an HDD has mainly been employed for the present invention. However, the present invention can be applied for a recording apparatus having not only an HDD, but also another rotary recording medium, such as a CD (Compact Disk), a DVD (Digital Video Disk) or a magneto-optical disk.

Although aspects of the present invention have been described with respect to a data storage system, executing operational code that directs the method of the present invention, it should be understood that the present invention alternatively is implemented as a program product for use with a data storage system or computer system. Programs defining the functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct the method functions of the present invention, represent alternative embodiments of the present invention. Further, it is understood that the present invention may be implemented by a system having means in the form of hardware, software, or a combination of software and hardware as described herein or their equivalent.

It should be understood that the present invention may be implemented as a program product for use with a data storage system or computer system. Programs defining the functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct the method functions of the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

The typical effects obtained by this embodiment are as follows. A stable operation within a practical range can be implemented for a rotational recording apparatus that includes a shock sensor and that adaptively processes the output of the shock sensor to obtain a feed forward signal.

What is claimed is:

1. A rotational recording apparatus comprising:
   a head for reading data from a rotatable recording medium;
   head driving means for driving said head;
   head position detection means for outputting current data for a position of said head on said recording medium;
   a controller for receiving a deviation between said current position data and a target position, and for generating a feedback control signal to be transmitted to said head driving means;
   a sensor for detecting a disturbance that acts on said rotational recording apparatus;
   a bandpass filter for passing an output signal of said sensor in a predetermined frequency band, wherein a pass band for said bandpass filter has a range between 200 Hz and 500 Hz;
   an adaptive filter for receiving said output signal of said bandpass filter and for generating a feed forward control signal to be transmitted to said head driving means;
   a phase shift filter for shifting a phase of said output signal of said bandpass filter; and
   adaptive algorithm means for calculating coefficients for said adaptive filter using said deviation and the signal output by said phase shift filter.

2. The rotational recording apparatus according to claim 1, wherein a difference between a phase of a signal that is passed through said phase shift filter and a phase of a signal that is passed through a model that has a transfer function $G/(1+GH)$, where G denotes transfer functions of said head driving means and said head position detection means, and H denotes a transfer function of said controller, falls within a predetermined range in said frequency band area.

3. The rotational recording apparatus according to claim 2, wherein said predetermined range is ±90 degrees.

4. The rotational recording apparatus according to claim 2, wherein the order of said phase shift filter is lower than the order of said model.

5. The rotational recording apparatus according to claim 2, wherein said order is a second or lower order.

6. The rotational recording apparatus according to claim 1, wherein a pass band for said bandpass filter has a range between 400 Hz and 500 Hz.

7. The rotational recording apparatus according to claim 1, further comprising:
   multiple sets of said bandpass filters, said adaptive filters, said phase shift filters and said adaptive algorithm means.

8. A method for controlling a rotational recording apparatus, which includes a head for reading data from a rotatable recording medium, head driving means for driving said head, head position detection means for outputting current position data for said head on said recording medium, a controller for receiving a deviation between said current position data and a target position and for generating a feedback control signal to be transmitted to said head driving means, and a sensor for detecting a disturbance that acts on said rotational recording apparatus, said method comprising the steps of:

sampling an output of said sensor and determining a sensor output s(n) that is discrete and quantized;

employing said sensor output s(n) to calculate output f(n) for a bandpass filter that has as a pass band a predetermined frequency band; and if $|f(n)|/|s(n)|>0.8$, then:

employing said output f(n) to calculate an output p(n) for a phase shift filter;

employing said output p(n) and an array P(n) composed of, as elements, values obtained at previous samplings for calculating coefficients R(n) for an adaptive filter;

employing said output f(n), an array F(n) composed of, as elements, values obtained at previous samplings, and said coefficients R(n) to calculate an output 1(n) for said adaptive filter; and adding said output 1(n) to said feedback control signal and transmitting the result to said head driving means.

9. The method according to claim 8, further comprising a step of:

determining whether the ratio of said output f(n) of said bandpass filter to said sensor output s(n) exceeds a predetermined value, wherein, when said ratio does not exceed said predetermined value, said outputs p(n), R(n) and 1(n) are not calculated, and said feed back control signal, to which said output 1(n) has not been added, is transmitted to said head driving means.

10. The method according to claim 8, wherein a difference between the phase of a signal that is passed through said phase shift filter and the phase of a signal that is passed through a model that has a transfer function G/(1+GH) (G denotes transfer functions of said head driving means and the head position detection means, and H denotes a transfer function of said controllers) falls within a predetermined range in said frequency band area.

11. The method according to claim 10, wherein said predetermined range is ±90 degrees.

12. The method according to claim 10, wherein the order of said phase shift filter is lower than the order of said model.

13. The method according to claim 10, wherein said order is a second or lower order.

14. The method according to claim 8, wherein a pass band for said bandpass filter has a range of from 200 Hz to 500 Hz.

15. A method comprising:

detecting a shock output (s(n)) of a shock sensor;

inputting s(n) into a bandpass filter to obtain a bandpass filter output (f(n));

calculating an absolute value of f(n) ($O_f$) and an absolute value of s(n) ($O_s$); and only if $O_f$ is greater than $O_s$, then:
calculating a phase shift filter output,
determining coefficients for an adaptive filter, wherein an output of the adaptive filter is obtained,
using the output of the adaptive filter to obtain a controller output, and
using the controller output to control a position of a head in a hard disk drive.

16. The method of claim 15, wherein the phase shift filter output is calculated, the coefficients for the adaptive filter are determined, the controller output is obtained, and the position of the head is controlled only if $O_f/O_s>0.8$.

* * * * *